United States Patent
Ansari (10) Patent No.: US 10,049,642 B2
(45) Date of Patent: Aug. 14, 2018

(54) SENDING FRAMES USING ADJUSTABLE VERTICAL BLANKING INTERVALS

(71) Applicant: INTEL CORPORATION, Santa Clara, CA (US)

(72) Inventor: Nausheen Ansari, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/387,428

(22) Filed: Dec. 21, 2016

(65) Prior Publication Data

US 2018/0174551 A1 Jun. 21, 2018

(51) Int. Cl.
- *G06F 3/14* (2006.01)
- *G09G 5/00* (2006.01)
- *G09G 5/36* (2006.01)

(52) U.S. Cl.
CPC .............. *G09G 5/006* (2013.01); *G06F 3/14* (2013.01); *G09G 5/363* (2013.01); *G09G 2320/0613* (2013.01); *G09G 2320/08* (2013.01); *G09G 2340/0435* (2013.01); *G09G 2360/02* (2013.01); *G09G 2370/12* (2013.01)

(58) Field of Classification Search
None
See application file for complete search history.

(56) References Cited

U.S. PATENT DOCUMENTS

| | | | | |
|---|---|---|---|---|
| 5,812,210 A | * | 9/1998 | Arai | G09G 1/165 348/441 |
| 6,373,476 B1 | * | 4/2002 | Dalgleish | G09G 1/165 345/204 |
| 6,798,418 B1 | * | 9/2004 | Sartori | G09G 3/3611 345/519 |
| 8,878,904 B2 | | 11/2014 | Slavenburg et al. | |
| 2005/0020228 A1 | * | 1/2005 | Yearim | G09G 5/008 455/260 |
| 2012/0147020 A1 | * | 6/2012 | Hussain | G06T 1/00 345/522 |
| 2015/0264298 A1 | * | 9/2015 | Colenbrander | H04N 7/013 345/547 |
| 2016/0063933 A1 | * | 3/2016 | Kobayashi | G09G 3/3614 345/691 |

\* cited by examiner

*Primary Examiner* — Joni Richer
(74) *Attorney, Agent, or Firm* — Intellectual IP Law Group, P.L.L.C.

(57) ABSTRACT

An example apparatus includes a processor to send a plurality of image frames to a display device via a digital display interface. At least two frames of the plurality of frames are to be displayed at a refresh rate that varies in response to an adjustment of a duration of a vertical blanking interval associated with the two frames.

18 Claims, 5 Drawing Sheets

SENDING FRAMES USING ADJUSTABLE VERTICAL BLANKING INTERVALS

BACKGROUND

Computing devices may include graphics processing units (GPUs) to render a frame to a frame buffer for display. Display panels can then receive the frame from the frame buffer and display the frames.

In some examples, page flipping may be used to send buffered frames to a display device. For example, video pointers may be used to indicate the location of a frame buffer to receive video rendering in a video memory and the location of an active display memory to send to the display. A video pointer may be an address in video memory. In some examples, when a frame buffer is ready to be displayed, the video pointers may be flipped. For example, an active display pointer may be switched to the frame buffer so that the display can receive and display the frame from the back buffer during the next refresh. The back buffer pointer may also be switched to the active display memory so that the active display memory can be overwritten and used as a new frame buffer. Thus, the previous frame buffer may now be the active display memory, and the previous active display memory may be the frame buffer to receive the next frame to be displayed.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

As discussed above, display panels may display frames according to a display refresh rate. In some examples, panels can use various modes to display frames. For example, a vertical sync (VSync) mode can be used to process flips at a fixed rate independent of rendering speed. In some examples, an asynchronous (ASync) mode may be used to process flips as soon as a frame buffer is ready.

The present disclosure relates generally to techniques for sending frame using adjustable vertical blanking intervals. Specifically, the techniques described herein include an apparatus, method and system for sending frames using adjustable vertical blanking intervals. As used herein, a vertical blanking interval refers to the time between the end of the final line of a frame and the beginning of the first line of the next frame. For example, the vertical blanking interval may be expressed as a number of lines. The frames may be sent from a frame transmit source to a display panel via a digital display interface. In some examples, a frame transmit source may be a video graphics adapter. An example apparatus includes a processor to send a plurality of image frames to a display panel via a digital display interface. At least two frames of the plurality of frames are to be displayed at a refresh rate that varies in response to an adjustment of a duration of a vertical blanking interval associated with the two frames. This may be performed in order to synchronize the display with the display source transmitter. The processor can adjust the variable refresh rate by adjusting a display period using an adjustable vertical blanking interval for each frame. The techniques described herein thus enable the refresh rates of displays to be dynamically synchronized with render rates of the sent frames. For example, rates at which frames are rendered may be variable. In particular, the techniques described herein may prevent tearing, lag, judder, and stutter, associated with render rates not being synchronized with display refresh rates.

Figure 1:
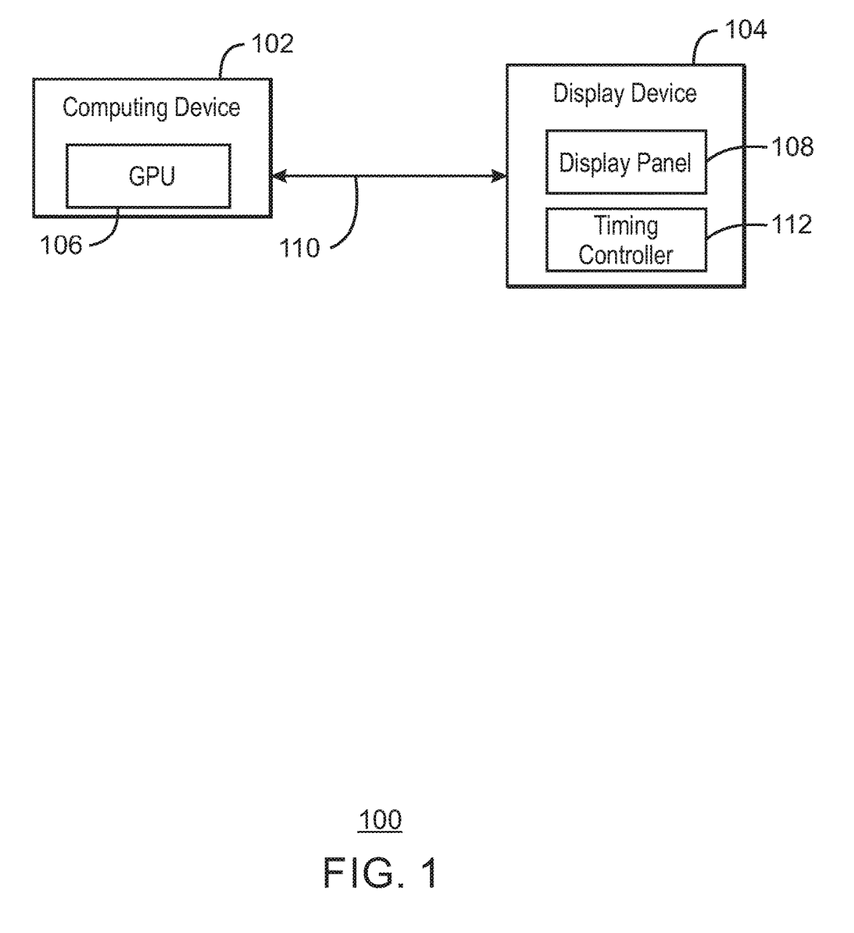
FIG. 1 is a block diagram illustrating an example system for sending frames using adjustable vertical blanking intervals.

FIG. 1 is a block diagram illustrating an example system for sending frames using adjustable vertical blanking intervals. The example system is referred to generally by the reference number 100 and can be implemented using the methods 300 or 400 of FIGS. 3-4 and the dynamic refresh engine 526 of the computing device 500 below in FIG. 5. For example, the example system 100 can be implemented in the GPU 508 of the computing device 500 below.

The example system 100 includes a computing device 102 and a display device 104. The computing device includes a graphics processing unit (106). The display device includes a display panel 108. The computing device 102 is communicatively coupled to the display device 104 via a digital display interface 110. For example, the digital display interface may be a High-Definition Multimedia Interface (HDMI). The display panel 108 may further include a timing controller 112 to adjust the refresh rate associated with each frame.

As shown in FIG. 1, a digital display interface 110 may communicatively couple a computing device 102 and a display device 104. In some examples, the GPU 106 of the computing device may be configured to render frames at a variable rate. For example, frames having more three dimensional objects to be rendered for a frame may take longer to process than frames having less three dimensional objects to be rendered. The computing device 102 may thus also be configured to synchronize rendered frames from the GPU 106 with a refresh rate of the display device 104.

For example, the computing device 102 can be configured to adjust a refresh rate by adjusting the duration of a vertical blanking period. For example, the vertical blanking period may be adjusted in response to detecting an absence of a flip for a subsequent frame within a threshold period of time. Thus, the display panel 108 can receive frames via the digital display interface 110 and display the frames with a variable refresh rate based on an adjustable vertical blanking interval for each frame. In this manner, the display may be synchronized with a display source transmitter. For example, the display source transmitter may be the GPU 106. In some examples, the computing device 102 can initially set the variable refresh rate to a rate that is faster than other supported rates. The computing device 102 may then detect an absence of a flip for the next frame at the end of an active period of an individual frame. The computing device 102 can then reduce the refresh rate for the individual frame in response to detecting the absence of the flip. In some examples, the variable refresh rate can be based on a display clock frequency of the display panel, a number of horizontal pixels, and a number of vertical blank lines. For example, the display clock frequency and the number of horizontal pixels can be held constant while the refresh rate is varied.

For example, the display panel 108 may include a display clock, also known as a dot clock or pixel clock, (not shown) that can operate at a display clock frequency. The display panel 108 may also include a number of horizontal pixels, including horizontal active pixels and horizontal blank pixels. The display panel 108 may further include a number of vertical rows, including vertical active rows and vertical blank rows. The refresh rate using the digital display interface 110 may be calculated by the equation:

$$RR = DC\_Frequency/(HTotal * VTotal) \quad \text{Eq. 1}$$

where the refresh rate (RR) is a function of the display clock frequency (DC_Frequency), the total number of horizontal pixels (HTotal), and the total number of vertical pixels (VTotal). For example, VTotal may be the period from the start of a frame to the start of the next frame. An active region of the frame, or vertical active time (VActive), maybe the start of a display frame to end of a display frame. An inactive region of the frame, or vertical blanking interval (VBlank) may be the period after the end of a display frame to the start of the next frame. Thus, total number lines (VTotal) may be equal to the number of active lines (VActive) plus the total number of blank lines (VBlank). In some examples, the refresh rate of the display device 104 may thus be adjusted by setting the display clock frequency and the total number of horizontal pixels to constant values, and changing the value of the total number of vertical pixels (VTotal). For example, a display clock frequency can be set to a maximum value specified for peak desired refresh rate. In some examples, the display panel 108 can set a display clock of the digital display interface 110 to a larger frequency value specified by the computing device 102 within a specified range of display clock values. For example, a display clock may be a clock at which the display panel 108 scans out. In some examples, the display clock may be forwarded from the computing device 102 to the display device 104. In some examples, the display panel 108 may have local Phase-Locked Loops (PLLs) that can track an incoming dot clock and adjust a local display clock. In some examples, the computing device 102 can modify the value of a Vtotal for each frame. For example, the number of vertical blank lines (VBlank) in VTotal can be dynamically controlled by the computing device 102 and modified for each displayed frame based on the time it takes for the next frame to be rendered to modify VTotal. In some examples, the computing device 102 can adjust the vertical blanking interval based on a detected flip at the GPU 106. For example, the computing device 102 can adjust VTotal until a flip is detected at the GPU 106. The computing device 102 may then stop adjusting the value of VTotal and send the next rendered frame to the display device 104 via the digital display interface 110. In some examples, computing device 102 can adjust the adjustable vertical blanking interval within a supported vertical blanking interval range of the display device 104. For example, the display device 104 may have sent a supported vertical blanking interval range to the computing device 102 upon being connected to the computing device 102 via the digital display interface 110. Thus, a variable rendering rate of the GPU 106 may be synchronized with the refresh rate of the display device 104 using a variable vertical blanking interval. By synchronizing the rendering rate and the refresh rate using the variable vertical blanking interval, the techniques described herein may thus prevent lag, stutter, and tearing caused by unsynchronized rendering and refresh rates.

The diagram of FIG. 1 is not intended to indicate that the example system 100 is to include all of the components shown in FIG. 1. Rather, the example system 100 can be implemented using fewer or additional components not illustrated in FIG. 1 (e.g., additional display devices, computing devices, GPUs, etc.).

Figure 2:
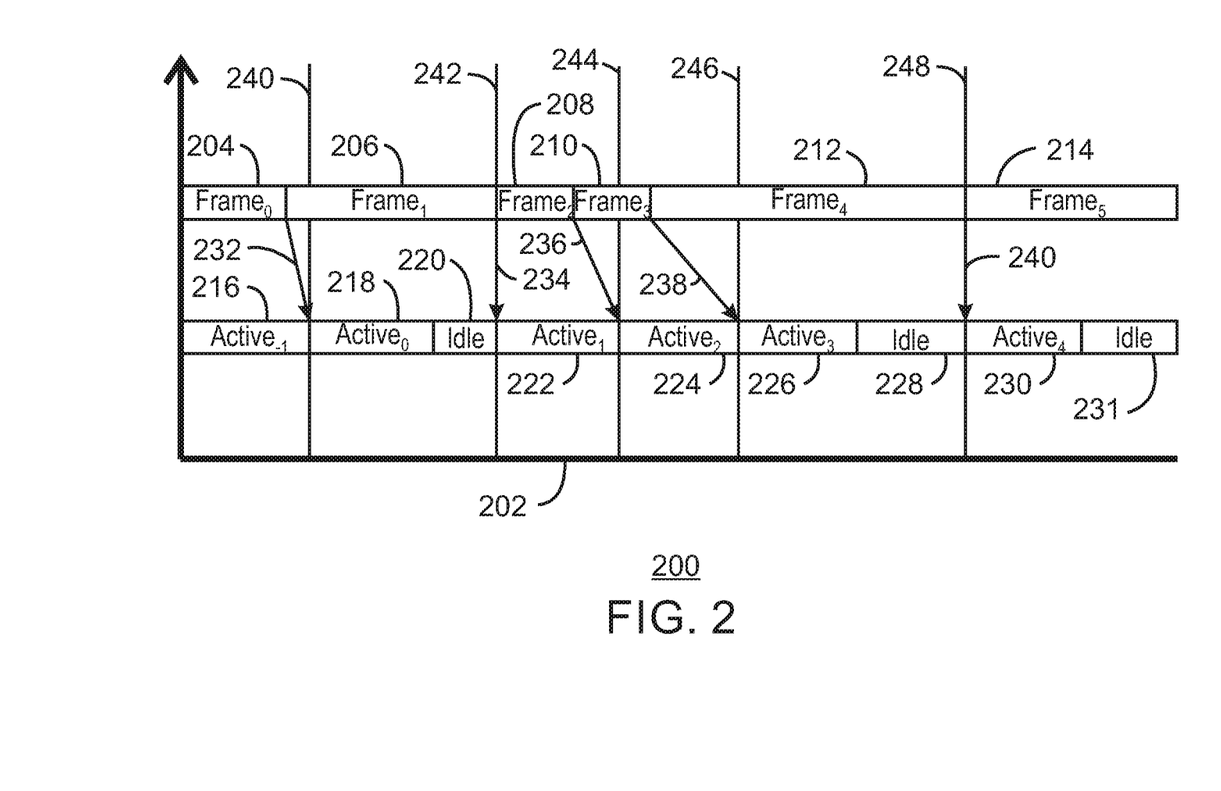
FIG. 2 is a time graph illustrating an example set of frames being displayed using adjustable vertical blanking intervals.

FIG. 2 is a time graph illustrating an example set of frames being displayed using adjustable blanking intervals. The example system is referred to generally by the reference number 200 and can be implemented using the method 300 of FIG. 3 and via the dynamic refresh engine 526 of the computing device 500 below in FIG. 5. For example, the example system 100 can be implemented in the GPU 508 of the computing device 500 below.

The graph 200 includes a horizontal axis depicting time 202. The graph 200 further includes a first row of blocks depicting a number of frames 204, 206, 208, 210, 212, 214 being rendered in that order, respectively. The graph 200 further includes a number of display states, 216, 218, 220, 222, 224, 226, 228, and 230. The display states 216, 218, 222, 224, 226, and 230 indicate an active period. For example, as used herein, an active period refers to a period of time in which a frame is displayed. In some examples, the active period may be a predetermined constant time. For example, the active period may be set to a period of time based on a range of refresh rates supported particular display. In some examples, the active period may correspond to the period of a refresh cycle of refresh rate that is faster than other refresh rates supported by the display. The display states 220, 228, indicate an idle state. An idle period, as used herein, refers to a variable period of time between active periods. For example, the idle period may be the time period of a vertical blanking interval. The graph 200 further includes a number of vertical cadence lines 240, 242, 244, 246, and 248, depicting a variable cadences. A cadence, as used herein, refers to an interval of time that a frame is displayed. For example, the cadence depicted using cadence lines 240, 242, 244, 246, 248 may be called a variable cadence, as frames may be displayed for varying time periods.

In FIG. 2, the number of frames 204, 206, 208, 210, 212, 214 rendered by a GPU are shown being displayed at a display device during active periods 218, 222, 224, 226, and 230, respectively. As shown in FIG. 2, idle periods 220, 228, and 231, are generated by the display device in order to synchronize the rate at which the frames 204, 206, 208, 210, 212, 214 are rendered and the rate at which the active periods 218, 222, 224, 226, and 230 occur. For example, the idle periods 220 and 228 may be generated by controlling the vertical blanking interval to produce the idle time. For example, the vertical blanking interval may be extended to generate a corresponding idle period before the next frame is displayed. Thus, the idle periods 220 and 228 may be used to synchronize the render rate of the GPU and the refresh rate of the display.

Figure 3:
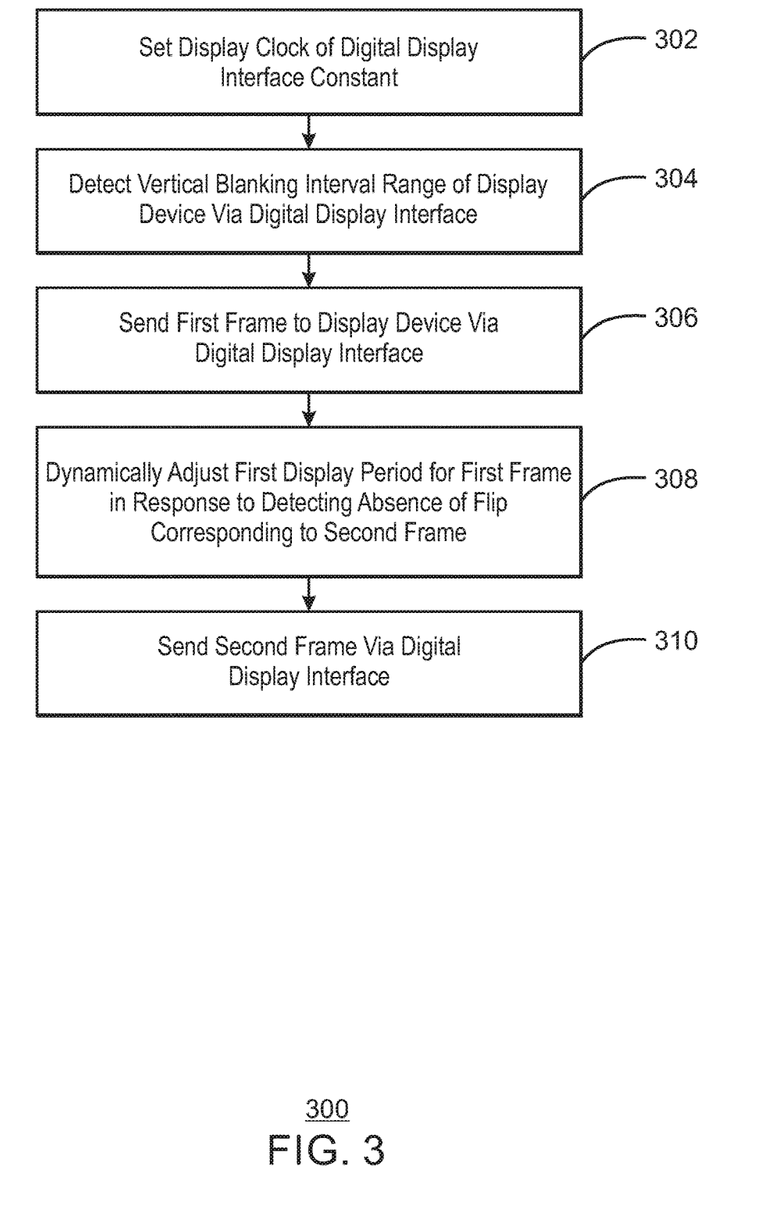
FIG. 3 is a flow chart illustrating a method for sending frames to be displayed using adjustable vertical blanking intervals.

FIG. 3 is a flow chart illustrating a method for sending frames to be displayed using adjustable vertical blanking intervals. The example method is generally referred to by the reference number 300 and can be implemented by the computing device 102 or GPU 106 or the dynamic refresh engine 526 of the computing device 500 below. For example, the example method 300 can be implemented by one or more of the display devices 518 of FIG. 5.

At block 302, a computing device sets a display clock of a digital display interface constant. For example, the computing device may be coupled to a display device via the digital display interface. In some examples, the computing device may include a graphics adapter and/or GPU. In some examples, the digital display interface may be a High-Definition Multimedia Interface (HDMI).

At block 304, the computing device detects a vertical blanking interval range of the display device via the digital display interface. For example, the vertical blanking interval range may be a preconfigured supported range of vertical blanking intervals. In some examples, the supported range of vertical blanking intervals may differ for different display devices. For example, the range of supported vertical blanking intervals may be based on the supported range of refresh rates of the display device.

At block 306, the computing device sends a first frame to a display device via the digital display interface. For example, the first frame may be a first rendered video frame. In some examples, the frame may then be displayed for a first display period including an active period and a threshold vertical blanking interval. For example, the threshold blanking interval may be a lower vertical blanking interval within a vertical blanking interval range. The active period can be a constant period for displaying a frame. For example, the active period can be based on a faster supported refresh rate of the display device.

At block 308, the computing device dynamically adjusts the first display period for the first frame in response to detecting an absence of a flip corresponding to a second frame. For example, the computing device can adjust a vertical blanking interval beyond the threshold vertical blanking interval and within a supported vertical blanking interval range. In some examples, the display device can adjust the vertical blanking interval until a flip is detected. For example, a detected flip indicates a second frame has been rendered at a frame source. In some examples, in response to detecting the flip, the computing device can stop adjusting the vertical blanking interval and send the next frame to the display device via the digital display interface.

At block 310, the computing device can send a second frame via the digital display interface. For example, the second frame may then be displayed for a second display period. For example, the first display period and the second display period may be different periods of time. In some examples, the computing device may also adjust the vertical blanking period of the second display period until a subsequent third frame is rendered and ready to be sent to the display device.

Thus, each individual frame sent to the display device may be displayed for different display periods based on the time used to render a subsequent frame. The computing device 102 may thus adjust the refresh rate of the display device for each frame in order to synchronize the refresh rate of the display device with the render rate of a GPU.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
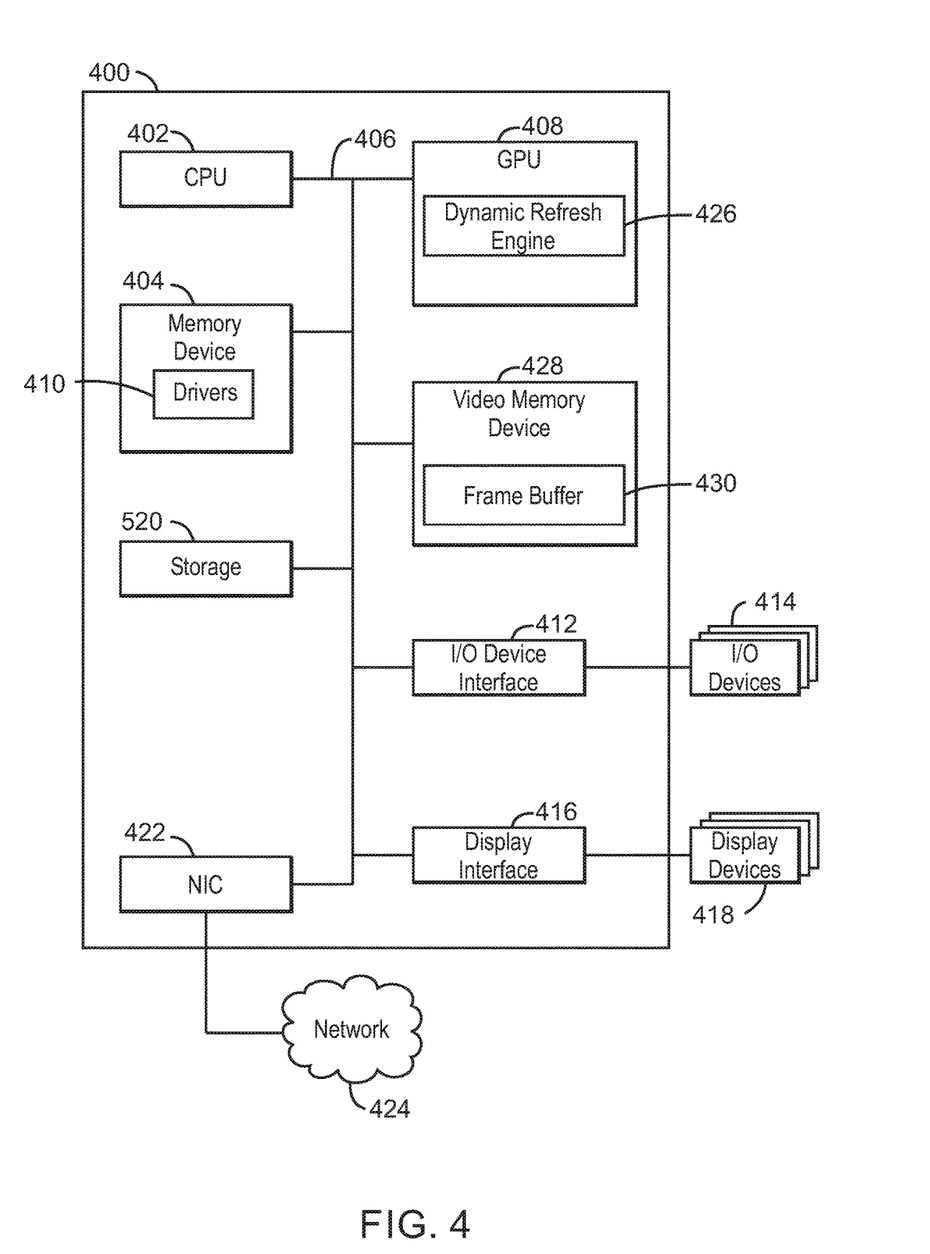
FIG. 4 is block diagram illustrating an example computing device that can send frames using adjustable vertical blanking intervals.

Referring now to FIG. 4, a block diagram is shown illustrating an example computing device that can send frames using adjustable vertical blanking intervals. The computing device 400 may be, for example, a laptop computer, desktop computer, tablet computer, mobile device, or camera, among others. In some examples, the computing device 400 may be a smart camera or a digital security surveillance camera. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. In some examples, the CPU 402 can be a specialized digital signal processor (DSP) used for image processing. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for device discovery. The device drivers 410 may be software, an application program, application code, or the like.

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for generating virtual input devices. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. In some examples, the display interface 416 may be a digital display interface. For example, the digital display interface may be an HDMI. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical storage such as, for example, a hard drive, an optical drive, a flash memory drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The GPU 408 further includes a dynamic refresh engine 408. For example, the dynamic refresh engine 408 may be configured to receive a supported blanking interval range from a display device 418 via a digital display interface 416. The dynamic refresh engine 408 can also detect rendered frames at the GPU. The dynamic refresh engine 408 can send a plurality of image frames to a display device via a digital display interface. For example, at least two frames of the plurality of frames are to be displayed at a refresh rate that varies in response to an adjustment of a duration of a vertical blanking interval associated with the two frames. For example, the two frames can each be displayed for a display period including a predefined active period and an adjustable vertical blanking interval. The dynamic refresh engine 408 can adjust a refresh rate of a display device based on the supported blanking interval range. For example, the dynamic refresh engine 408 can adjust the duration of the vertical blanking interval within a supported vertical blanking interval range of the display device. In some examples, the dynamic refresh engine 408 can adjust the duration of the vertical blanking interval based on a detected flip. In some examples, the dynamic refresh engine 408 can set the refresh rate to a rate that is faster than other supported rates, detect an absence of a flip for a second frame at the end of an active period of a first frame, and reduce the refresh rate for the first frame in response to detecting the absence of the flip. In some examples, the refresh rate is to be based on a display clock frequency of the display device, a number of horizontal pixels, and a number of vertical blank lines, wherein the display clock frequency and the number of horizontal pixels are to be held constant while the refresh rate is varied. In some examples, the dynamic refresh engine 408 can set a display clock of the digital display interface to a larger value within a specified range of display clock values. For example, the dynamic refresh engine 408 may perform the method 300 of FIG. 3 above.

The computing device 400 also include a video memory device 428. For example, the video memory device 428 may be random access memory (RAM) that is reserved for graphics processing. For example, the video memory device may include one or more frame buffers 430. A frame buffer 430 may be an address space in the video memory device 428 that can be used by the GPU 408 for rendering frames. In some examples, the GPU 408 may use two or more frame buffers 430 to render individual frames and flip between the frame buffers 430 to send rendered frames to a display device 418 via the display interface 416. For example, a flip may be performed by modifying a video memory pointer.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. The computing device 400 may include any number of additional components not shown in FIG. 4, depending on the details of the specific implementation. Furthermore, any of the functionalities of the CPU 402 or GPU 408 may be partially, or entirely, implemented in hardware and/or in a processor. For example, the functionality of the dynamic refresh engine may be implemented with an application specific integrated circuit, in logic implemented in a processor, in logic implemented in a specialized graphics processing unit such as the GPU 408, or in any other device.

Figure 5:
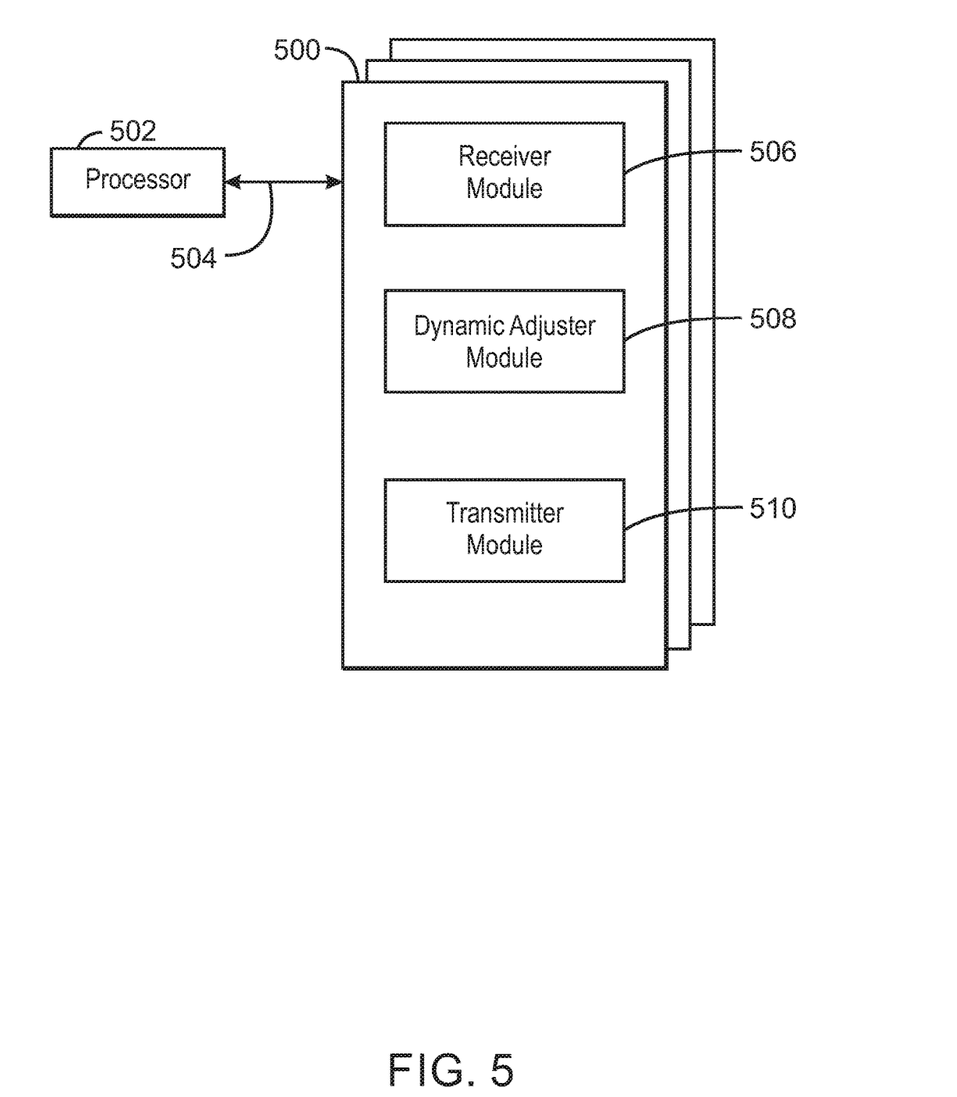
FIG. 5 is a block diagram showing computer readable media 600 that store code for sending frames to a display using adjustable vertical blanking intervals.

FIG. 5 is a block diagram showing computer readable media 500 that store code for sending frames to a display using adjustable vertical blanking intervals. The computer readable media 500 may be accessed by a processor 502 over a computer bus 504. Furthermore, the computer readable medium 500 may include code configured to direct the processor 502 to perform the methods described herein. In some embodiments, the computer readable media 500 may be non-transitory computer readable media. In some examples, the computer readable media 500 may be storage media.

The various schemes discussed herein may be implemented, at least in part, by instructions stored on one or more computer readable media 500, as indicated in FIG. 5. For example, a receiver module 506 may be configured to receive a supported vertical blanking interval range of a display device. In some examples, the receiver module 506 may be configured to receive the supported vertical blanking interval during a hand shake. For example, the receiver module 506 may be configured to receive the vertical blanking interval range of the display device via a digital display interface.

A dynamic adjuster module 508 may be configured to set a display clock of the digital display interface constant. The dynamic adjust module 508 may also be configured to set a variable refresh rate to a rate that is faster than other supported rates. For example, the variable refresh rate may be set to a rate that is the fastest supported rate by both the displace device and a GPU. A transmitter module 510 may be configured to send a first frame to the display device. The dynamic adjuster module 508 may be configured to dynamically adjust a first display period for the first frame in response to not detecting a flip corresponding to a second frame. For example, the first display period can include a predefined active period and an adjustable vertical blanking interval. In some examples, the first display period may be based on a display clock frequency of the display device, a number of horizontal pixels, and a number of vertical blank lines. For example, the display clock frequency and the number of horizontal pixels can be held constant while the vertical blanking interval range is varied. In some examples, the dynamic adjuster module 508 may be configured to adjust a vertical blanking interval beyond the threshold vertical blanking interval and within the detected vertical blanking interval range. In some examples, the dynamic adjuster module 508 may be configured to adjust the vertical blanking interval until the flip corresponding to the second frame is detected. In some examples, the transmitter module 510 may be configured to send a second frame to be displayed for a second display period, wherein the first display period and the second display period comprise different periods of time.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation.

EXAMPLES

Example 1 is an apparatus for sending frames. The apparatus includes a processor to send a plurality of image frames to a display device via a digital display interface. At least two frames of the plurality of frames are to be displayed at a refresh rate that varies in response to an adjustment of a duration of a vertical blanking interval associated with the two frames.

Example 2 includes the apparatus of example 1, including or excluding optional features. In this example, the processor is to adjust the duration of the vertical blanking interval within a supported vertical blanking interval range of the display device.

Example 3 includes the apparatus of any one of examples 1 to 2, including or excluding optional features. In this example, the processor is to adjust the duration of the vertical blanking interval based on a detected flip.

Example 4 includes the apparatus of any one of examples 1 to 3, including or excluding optional features. In this example, the processor is to receive a supported vertical blanking interval range from a display device via the digital display interface.

Example 5 includes the apparatus of any one of examples 1 to 4, including or excluding optional features. In this example, the processor is to: set the refresh rate to a rate that is faster than other supported rates; detect an absence of a flip for a second frame at the end of an active period of a first frame; and reduce the refresh rate for the first frame in response to detecting the absence of the flip.

Example 6 includes the apparatus of any one of examples 1 to 5, including or excluding optional features. In this example, the refresh rate is to be based on a display clock frequency of the display device, a number of horizontal pixels, and a number of vertical blank lines, wherein the display clock frequency and the number of horizontal pixels are to be held constant while the refresh rate is varied.

Example 7 includes the apparatus of any one of examples 1 to 6, including or excluding optional features. In this example, the two frames are to each be displayed for a display period including a predefined active period and an adjustable vertical blanking interval.

Example 8 includes the apparatus of any one of examples 1 to 7, including or excluding optional features. In this example, the processor is to set a display clock of the digital display interface to a larger value within a specified range of display clock values.

Example 9 includes the apparatus of any one of examples 1 to 8, including or excluding optional features. In this example, the processor includes a graphics processing unit (GPU).

Example 10 includes the apparatus of any one of examples 1 to 9, including or excluding optional features. In this example, the digital display interface includes a High-Definition Multimedia Interface (HDMI).

Example 11 is a method for sending frames. The method includes setting a display clock of a digital display interface constant. The method includes detecting a vertical blanking interval range of a display device via the digital display interface. The method includes sending a first frame to the display device via the digital display interface; and dynamically adjusting a first display period for the first frame in response to detecting an absence of a flip corresponding to a second frame.

Example 12 includes the method of example 11, including or excluding optional features. In this example, dynamically adjusting the first display period includes adjusting a vertical blanking interval beyond the threshold vertical blanking interval and within the detected vertical blanking interval range.

Example 13 includes the method of any one of examples 11 to 12, including or excluding optional features. In this example, dynamically adjusting the first display period includes adjusting the vertical blanking interval until a flip is detected.

Example 14 includes the method of any one of examples 11 to 13, including or excluding optional features. In this example, the method includes sending a second frame to be displayed for a second display period via the digital display interface, wherein the first display period and the second display period include different periods of time.

Example 15 includes the method of any one of examples 11 to 14, including or excluding optional features. In this example, a detected flip indicates a second frame has been rendered at a frame source.

Example 16 includes the method of any one of examples 11 to 15, including or excluding optional features. In this example, the first display period includes an active period including a constant period for displaying a frame based on a faster supported refresh rate of the display device.

Example 17 includes the method of any one of examples 11 to 16, including or excluding optional features. In this example, the vertical blanking interval range includes a preconfigured supported range of vertical blanking intervals.

Example 18 includes the method of any one of examples 11 to 17, including or excluding optional features. In this example, the vertical blanking interval range includes a range of supported vertical blanking intervals based on the supported range of refresh rates of the display device.

Example 19 includes the method of any one of examples 11 to 18, including or excluding optional features. In this example, the display is coupled to the display source transmitter via the digital display interface.

Example 20 includes the method of any one of examples 11 to 19, including or excluding optional features. In this example, the digital display interface includes a High-Definition Multimedia Interface (HDMI).

Example 21 is at least one computer readable medium for adjusting display periods having instructions stored therein that. The computer-readable medium includes instructions that direct the processor to receive a vertical blanking interval range of a display device. The computer-readable medium includes instructions that direct the processor to send a first frame to the display device. The computer-readable medium includes instructions that direct the processor to dynamically adjust a first display period for the first frame in response to not detecting a flip corresponding to a second frame.

Example 22 includes the computer-readable medium of example 21, including or excluding optional features. In this example, the computer-readable medium includes instructions to set a display clock of the digital display interface constant.

Example 23 includes the computer-readable medium of any one of examples 21 to 22, including or excluding optional features. In this example, the computer-readable medium includes instructions to adjust a vertical blanking interval beyond the threshold vertical blanking interval and within the detected vertical blanking interval range.

Example 24 includes the computer-readable medium of any one of examples 21 to 23, including or excluding optional features. In this example, the computer-readable medium includes instructions to adjust the vertical blanking interval until the flip corresponding to the second frame is detected.

Example 25 includes the computer-readable medium of any one of examples 21 to 24, including or excluding optional features. In this example, the computer-readable medium includes instructions to send a second frame to be displayed for a second display period, wherein the first display period and the second display period include different periods of time.

Example 26 includes the computer-readable medium of any one of examples 21 to 25, including or excluding optional features. In this example, the computer-readable medium includes instructions to receive the supported vertical blanking interval during a hand shake.

Example 27 includes the computer-readable medium of any one of examples 21 to 26, including or excluding optional features. In this example, the computer-readable medium includes instructions to set a variable refresh rate to a rate that is faster than other supported rates.

Example 28 includes the computer-readable medium of any one of examples 21 to 27, including or excluding optional features. In this example, the computer-readable medium includes instructions to receive the vertical blanking interval range of the display device via a digital display interface.

Example 29 includes the computer-readable medium of any one of examples 21 to 28, including or excluding optional features. In this example, the first display period includes a predefined active period and an adjustable vertical blanking interval.

Example 30 includes the computer-readable medium of any one of examples 21 to 29, including or excluding optional features. In this example, the first display period is to be based on a display clock frequency of the display device, a number of horizontal pixels, and a number of vertical blank lines, wherein the display clock frequency and the number of horizontal pixels are to be held constant while the vertical blanking interval range is varied.

Example 31 is a system for sending frames. The system includes means for sending a plurality of image frames to a display device via a digital display interface. At least two frames of the plurality of frames are to be displayed at a refresh rate that varies in response to an adjustment of a duration of a vertical blanking interval associated with the two frames.

Example 32 includes the system of example 31, including or excluding optional features. In this example, the means for sending the plurality of image frames is to adjust the duration of the vertical blanking interval within a supported vertical blanking interval range of the display device.

Example 33 includes the system of any one of examples 31 to 32, including or excluding optional features. In this example, the means for sending the plurality of image frames is to adjust the duration of the vertical blanking interval based on a detected flip.

Example 34 includes the system of any one of examples 31 to 33, including or excluding optional features. In this example, the means for sending the plurality of image frames is to receive a supported vertical blanking interval range from a display device via the digital display interface.

Example 35 includes the system of any one of examples 31 to 34, including or excluding optional features. In this example, the means for sending the plurality of image frames is to: set the refresh rate to a rate that is faster than other supported rates; detect an absence of a flip for a second frame at the end of an active period of a first frame; and reduce the refresh rate for the first frame in response to detecting the absence of the flip.

Example 36 includes the system of any one of examples 31 to 35, including or excluding optional features. In this example, the refresh rate is to be based on a display clock frequency of the display device, a number of horizontal pixels, and a number of vertical blank lines, wherein the display clock frequency and the number of horizontal pixels are to be held constant while the refresh rate is varied.

Example 37 includes the system of any one of examples 31 to 36, including or excluding optional features. In this example, the two frames are to each be displayed for a display period including a predefined active period and an adjustable vertical blanking interval.

Example 38 includes the system of any one of examples 31 to 37, including or excluding optional features. In this example, the means for sending the plurality of image frames is to set a display clock of the digital display interface to a larger value within a specified range of display clock values.

Example 39 includes the system of any one of examples 31 to 38, including or excluding optional features. In this example, the means for sending the plurality of image frames includes a graphics processing unit (GPU).

Example 40 includes the system of any one of examples 31 to 39, including or excluding optional features. In this example, the digital display interface includes a High-Definition Multimedia Interface (HDMI).

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   a processor to:
   receive a supported vertical blanking interval range from a display device via a digital display interface;
   send a plurality of image frames to the display device via the digital display interface, wherein at least two frames of the plurality of frames are to be displayed at a refresh rate that varies in response to an adjustment of a duration of a vertical blanking interval associated with the two frames, wherein the processor is to adjust the duration of the vertical blanking interval within the supported vertical blanking interval range of the display device; and
   forward a display clock value to the display device to adjust the refresh rate of the display device, wherein adjusting the refresh rate comprises local Phase-Locked Loops (PLLs) in the display device tracking an incoming dot clock and adjusting a local display clock.

2. The apparatus of claim 1, wherein the processor is to adjust the duration of the vertical blanking interval based on a detected flip.

3. The apparatus of claim 1, wherein the processor is to:
   set the refresh rate to a rate that is faster than other supported rates;
   detect an absence of a flip for a second frame at the end of an active period of a first frame; and
   reduce the refresh rate for the first frame in response to detecting the absence of the flip.

4. The apparatus of claim 1, wherein the refresh rate is to be based on a display clock frequency of the display device, a number of horizontal pixels, and a number of vertical blank lines, wherein the display clock frequency and the number of horizontal pixels are to be held constant while the refresh rate is varied.

5. The apparatus of claim 1, wherein the two frames are to each be displayed for a display period comprising a predefined active period and an adjustable vertical blanking interval.

6. The apparatus of claim 1, wherein the processor is to set a display clock of the digital display interface to a larger value within a specified range of display clock values.

7. The apparatus of claim 1, wherein the processor comprises a graphics processing unit (GPU).

8. The apparatus of claim 1, wherein the digital display interface comprises a High-Definition Multimedia Interface (HDMI).

9. A method, comprising:
   setting a display clock of a digital display interface constant;
   detecting a supported vertical blanking interval range of a display device via the digital display interface;
   sending a first frame to the display device via the digital display interface;
   dynamically adjusting a first display period for the first frame in response to detecting an absence of a flip corresponding to a second frame by adjusting a duration of a vertical blanking interval within the supported vertical blanking interval range of the display device; and
   forwarding a display clock value to the display device to adjust a refresh rate of the display device, wherein adjusting the refresh rate comprises local Phase-Locked Loops (PLLs) in the display device tracking an incoming dot clock and adjusting a local display clock.

10. The method of claim 9, wherein dynamically adjusting the first display period comprises adjusting a vertical blanking interval beyond a threshold vertical blanking interval and within the detected vertical blanking interval range.

11. The method of claim 9, wherein dynamically adjusting the first display period comprises adjusting the vertical blanking interval until a flip is detected.

12. The method of claim 9, comprising sending a second frame to be displayed for a second display period via the digital display interface, wherein the first display period and the second display period comprise different periods of time.

13. The method of claim 9, wherein a detected flip indicates a second frame has been rendered at a frame source.

14. At least one non-transitory computer readable medium for adjusting display periods having instructions stored therein that, in response to being executed on a computing device, cause the computing device to:
   detect a supported vertical blanking interval range of a display device;
   send a first frame to the display device;
   dynamically adjust a first display period for the first frame in response to not detecting a flip corresponding to a second frame by adjusting a duration of a vertical blanking interval within the supported vertical blanking interval range of the display device; and
   forward a display clock value to the display device to adjust a refresh rate of the display device, wherein adjusting the refresh rate comprises local Phase-Locked Loops (PLLs) in the display device tracking an incoming dot clock and adjusting a local display clock.

15. The at least one non-transitory computer readable medium of claim 14, comprising instructions to set a display clock of a digital display interface constant.

16. The at least one non-transitory computer readable medium of claim 14, comprising instructions to adjust a vertical blanking interval beyond a threshold vertical blanking interval and within the detected vertical blanking interval range.

17. The at least one non-transitory computer readable medium of claim 14, comprising instructions to adjust the vertical blanking interval until the flip corresponding to the second frame is detected.

18. The at least one non-transitory computer readable medium of claim 14, comprising instructions to send a second frame to be displayed for a second display period, wherein the first display period and the second display period comprise different periods of time.

* * * * *